Dec. 21, 1954    L. B. COWLES    2,697,445
REGULATING DEVICE
Filed Jan. 29, 1949
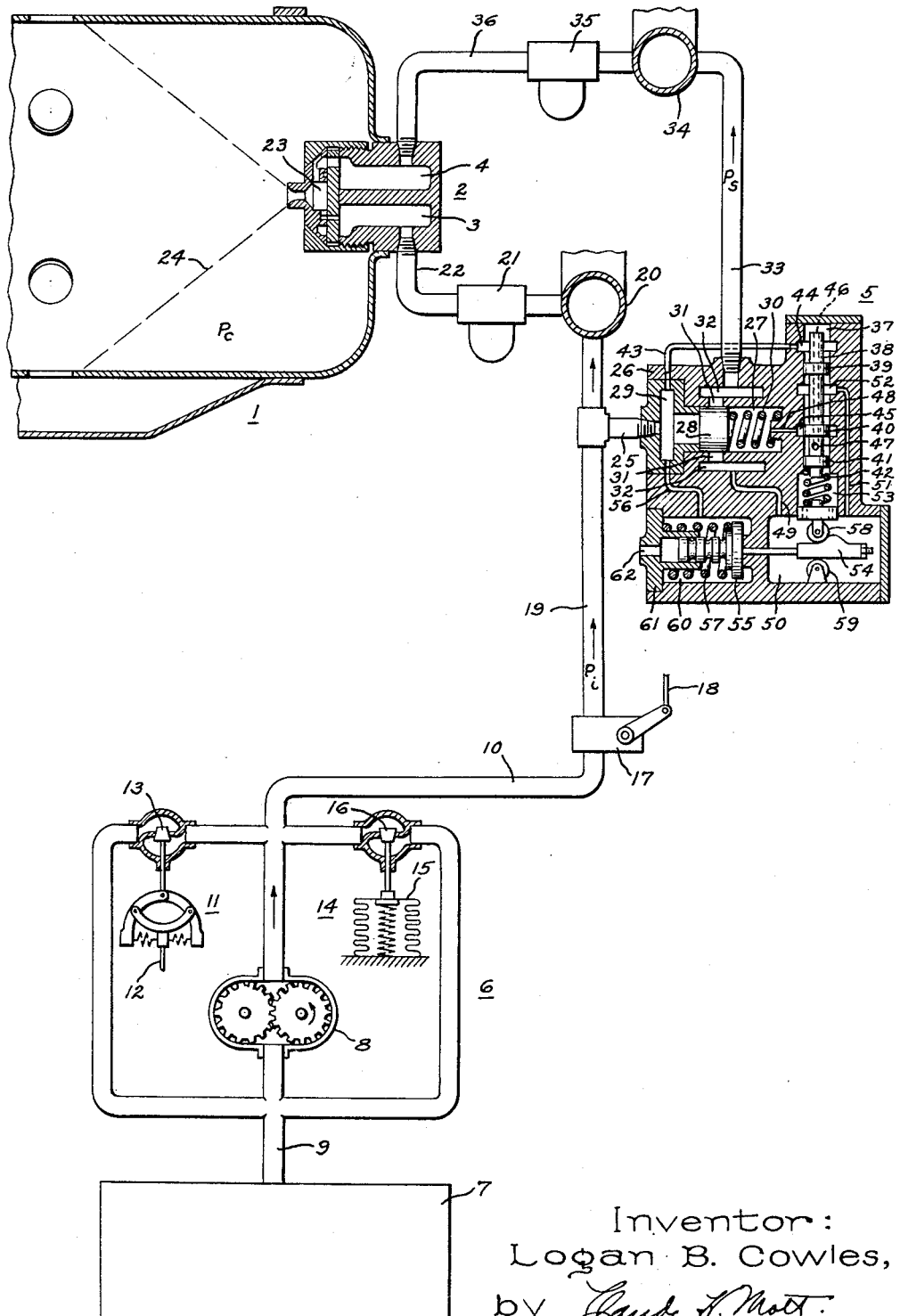
Inventor:
Logan B. Cowles,
by Claude A. Mott
His Attorney.

United States Patent Office 2,697,445
Patented Dec. 21, 1954

2,697,445

REGULATING DEVICE

Logan B. Cowles, Schenectady, N. Y., assignor to General Electric Company, a corporation of New York Application January 29, 1949, Serial No. 73,475

11 Claims. (Cl. 137—492)

The present invention relates to an improved regulating device for hydraulic systems. More particularly, it relates to an improved valve for throttling the flow of fluid from a primary conduit to a secondary conduit to obtain a desired fluid pressure differential as a function of the fluid pressure in the primary conduit.

This invention has many applications and may be used particularly in connection with liquid fuel metering systems for gas turbine powerplants of the type disclosed in patent application Serial No. 622,604, filed October 16, 1945 in the names of Charles D. Fulton and David C. Ipsen and assigned to the instant assignee, now Patent No. 2,590,853.

The regulating devices when employed in a system of this type, performs the function of dividing the fuel flow between the small and large slots of a duplex type fuel nozzle of a gas turbine. The regulating device, or "flow divider," as it is commonly known, which is employed in the above mentioned system, accomplishes its function by throttling the flow of fuel to the large slots of the engine by means of a variable area orifice consisting of a plate having a hole into which a contoured pin is variably positioned by the action of a pressure responsive bellows.

While the contoured pin flow divider is simple in design and generally satisfactory in operation, a device for this purpose is desired which will permit a higher rate of flow when the flow divider is completely open, while at the same time providing a more positive shutoff operation for withholding flow completely from the large nozzle when such flow is not desired. Further, the contoured pin flow divider is primarily a rate-of-flow control device having a flow control opening of a size proportional to input pressure, whereas it would be advantageous to have a flow divider which operates entirely on a pressure differential basis permitting a volume of flow to the large slots which maintains a predetermined pressure differential between the input and the output of the flow divider. This would offer greater predictability of flow rates in the design of fuel systems and provide a flow divider which may be employed, with only minor modifications, in a number of different sizes of fuel systems.

An object of my invention is to provide an improved regulating device for controlling pressure in hydraulic systems.

Another object is to provide an improved throttling valve which will maintain a fluid pressure differential between a primary source of supply and a secondary source of supply as a preselected function of the primary inlet pressure.

The invention will be more fully understood by referring now to the accompanying drawing of a diagrammatically represented liquid fuel spraying system in which my pressure regulating device is illustrated in semi-cross-sectional elevation.

Referring now to the drawing, a combustion chamber or "combustor" 1 is supplied with atomized liquid fuel by a vortex spray nozzle 2 of the "duplex" type in which a primary chamber 3 is supplied with liquid at the full inlet pressure, while a secondary chamber 4 is supplied with liquid at a reduced pressure from pressure regulating device 5.

Liquid fuel under pressure is furnished by a supply system represented diagrammatically at 6. The fuel supply system 6 may be of any suitable type and includes a fuel supply tank 7, a positive displacement pump 8, represented as being of the well-known gear type driven by any suitable means (not shown) and having a suction conduit 9 and a discharge conduit 10. A combination of auxiliary devices control the discharge pressure of the pump 8 so as to supply liquid to discharge conduit 10 at a pressure which varies as a preselected function of the throttle setting, or of the fuel flow or heat liberation desired. These control devices are represented as comprising a speed responsive flyball governor 11 arranged to be driven at a speed proportional to the rotation speed of the powerplant by means of a shaft 12. This speed governor 11 actuates a bypass valve 13 which permits liquid from the discharge conduit 10 to be returned to the pump inlet conduit 9 as a function of speed. Similarly, barometric device 14 comprises an evacuated bellows 15 arranged to actuate a bypass valve 16 to reduce the liquid pressure in conduit 10 as a function of altitude, or some other pressure appurtenant to the operation of the system.

Instead of the supply system 6, other arrangements may be used for supplying fuel to the conduit 10 according to a preselected pressure schedule.

A valve 17 actuated by any suitable linkage 18 may be arranged to serve both as a stopcock for completely shutting off the supply of liquid to the nozzle system, and as a throttle valve for metering the fuel in accordance with the fuel flow or heat liberation desired. It will be apparent that the valve 17 may be considered a part of the fuel supply system 6.

As will be seen, the valve 17 may be adjusted so that the liquid supply system 6 will produce a pressure $P_1$ in the main inlet or "primary" conduit 19. Liquid at pressure $P_1$ is supplied directly from conduit 19 to the small slots of the nozzle 2 via a manifold 20, a suitable filter 21, branch conduit 22 and the primary chamber 3 of the nozzle 2. The liquid flowing through the vortex chamber 23 into combustor 1 forms a fuel spray cone 24. For convenience it will be assumed herein that pressure drops in the conduits can be neglected so that the pressure in the primary chamber 3 of the nozzle is the same value ($P_1$) as obtained at the entrance to the fuel nozzle system, that is, the discharge side of valve 17.

The purpose of regulator 5 is to effectively throttle the flow from primary conduit 19 to the secondary chamber 4 of nozzle 2 to obtain the desired pressure differential as a function of $P_1$ pressure. A branch conduit 25 provides communication from primary conduit 19 to the regulator 5 which, more specifically comprises a housing consisting of a main casting 26 having an axial bore forming the interior chamber 27 into which is inserted a valve or throttling piston 28. Fluid from conduit 25 is communicated to a junction chamber 29 and in response to increases of fluid pressure $P_1$ the piston 28 moves axially to the right, principally against the action of an opposing fluid pressure in a manner hereinafter to be more fully explained. A spring 30 is mounted within the chamber 27 and exerts a light pressure to the left. When the unit is not operating, the spring 30 will close valve 28.

When the piston 28 moves to the right, it gradually opens symmetrically disposed holes 31 to the passage of fluid to an annular chamber 32 which completely surrounds and is concentric with chamber 27. From annular chamber 32 fluid passes into the secondary conduit 33, then to manifold 34, filter 35 and branch conduit 36 into the secondary nozzle chamber 4 from where it is sprayed to combustor 1 via the vortex chamber 23. It will be understood that if the position of the throttling piston 28 is properly adjusted, any desired differential pressure can be maintained between the fluid flowing in primary conduit 19 and that flowing into the secondary conduit 33, and that the secondary pressure $P_s$ in conduit 33 may be regulated without regard to the flow in the secondary conduit 33. The structure by means of which the throttling piston 28 is automatically positioned to provide a differential pressure which varies as a preselected function of primary pressure will now be described.

The main casting 26 also includes a second axial bore forming a rather elongated interior chamber 37 into which is slidably inserted a pilot valve member 38 having lands 39, 40 and 41 which are adapted closely but slidably and rotatably to fit within the pilot valve chamber 37 and to effect axially spaced closures within chamber 37. Pilot valve 38 is biased by a spring 42 acting to urge the pilot valve upward. The load on spring 42 may be varied in accordance with the position of a cam to be more fully described later. The pilot valve 38 may be moved in response to various fluid pressures, one being that acting on the top of land 39 due to fluid flowing from the junction chamber 29 through the duct 43 and into port 44 of the pilot valve chamber 37. The pilot valve 38 is in the upward position when the pressure $P_1$ is low due to the stronger action of spring 42 in which position the land 40 has moved to open the port 45 permitting the fluid entering chamber 37 from port 44 to also pass through an internal bore 46 out through opening 47 and into the right end of the throttling valve chamber 27 via port 45 and duct 48 thus creating an opposing pressure urging the throttling piston 28 to the left. As $P_1$ pressure increases, the pilot valve 38 will move gradually downward until land 40 closes port 45 to the passage of fluid from bore 46 and opens the port 45 so that fluid from the right end of chamber 27 may drain into the closure between the lands 39 and 40. In the meantime, the increase in pressure $P_1$ will have caused the throttling piston 28 to move to the right, opening the holes 31 so that fluid will have started to flow into the annular chamber 32. Although this fluid flows directly into the secondary conduit 33, it will be noted that it also communicates with the right end of chamber 27 via duct 49, chamber 50, duct 51, port 52, the closure between lands 39 and 40, port 45 and duct 48. At the same time, the fluid entering the chamber 50 passes into the area 53 and assists the spring 42 to exert an upward pressure against the bottom of land 41. For a given pressure $P_1$ the throttle valve 28 will assume a position so that the combined force of spring 42 and the pressure of the fluid acting upward against the bottom of land 41 just balances the force of fluid pressure acting downward against the top of the land 39. Thus it can be seen that the difference in these pressures or delta P depends directly on the bias force exerted by spring 42, the loading of which may be varied as a preselected function of $P_1$ pressure, divided by the cross-sectional area of chamber 37.

The bias of the spring 42 may be varied by a cam 54 connected to a piston member 55 and adapted to move at right angles to the pilot valve 38 in response to the pressure of the fluid communicated from the junction chamber 29 through duct 56. It will be seen that as pressure $P_1$ increases, the piston 55 and cam 54 will be moved to the left against the bias of a spring 57 and, depending on the configuration of the surface of the cam 54, its movement will cause the spring 42 to be loaded as desired according to any preselected characteristic. A wheel member 58 in interposed between the spring 42 and the cam 54 to insure a minimum of friction at the point of engagement with the surface of the cam 54. An additional wheel member 59 may also be mounted on the casting 26 to provide a lower bearing on which the bottom of the cam 54 can ride.

The chamber within which the piston 55 moves is closed by a plate 61 comprising a cylindrical recess in which the left end of the piston is slidably inserted. This cylindrical recess is provided with an outlet 62 to the atmosphere.

The operation of my differential pressure regulating device as embodied in a liquid fuel spraying system should now be clear from the foregoing explanation. Briefly, for all inlet pressures $P_1$ below a certain critical value, the throttling piston 28 will be in its extreme left position due to the return action of the spring 30 and there will be no flow via the regulator into the conduit 33. Therefore, there will be no flow to secondary nozzle chamber 4 and the entire flow to nozzle 2 will be through conduit 19, manifold 20, filter 21, branch conduit 22, primary chamber 3 and out through the vortex chamber 23. As pressure $P_1$ increases, a pressure is exerted against throttling piston 28 tending to move it to the right. This same pressure simultaneously acts upon the upper end of the pilot valve against land 39 tending to move the pilot valve 38 downward against the action of bias spring 42. Fluid enters through the internal bore 46 coming out through the hole 47 and passes on through duct 45 and conduit 48 into the right end of chamber 27, thus creating an opposing pressure tending to prevent the throttling piston 28 from moving to the right. With increases in fluid pressure $P_1$ the pilot valve 38 is caused to move progressively downward and to gradually close off port 45 to fluid communicated via internal bore 46 and to open port 45 to the passage of fluid between chamber 27 and the closure between lands 39 and 40 thus reducing the pressure in chamber 27 and allowing the throttling piston 28 to move to the right. When the valve 28 has moved to the right so as to uncover the holes 31, fluid will pass into the annular chamber 32, through conduit 49, into chamber 50 and into the area 53 where it aids the spring 42 in exerting an upward pressure on the pilot valve against land 41 tending to oppose the above-mentioned downward pressure on the pilot valve 38. Thus for a given pressure $P_1$ the throttling piston 28 will assume a position so that the force of the spring 42 and the pressure exerted by the fluid against the bottom of land 41 will just balance the force of the fluid against the top of the land 39, and for any given loading of the bias spring 42, the throttling piston 28 will move to a position such that a predetermined pressure differential exists between the fluid flowing in conduit 19 and that allowed to flow into conduit 33. The pilot valve 38, in this phase of operation, is therefore actually a positioning servo for positioning throttling valve 28 at a position which will maintain the predetermined pressure difference between $P_1$ and $P_s$. This pressure differential will be maintained exactly for fluid flows up to the maximum opening of throttling valve 28, whether the flow divider is applied to a system which requires or permits a relatively high or a relatively low volume of flow in the secondary conduit 33. This is true because the pilot valve or servo 38 is maintained in the intermediate position shown, by a balancing of the relatively higher input pressure $P_1$, on the top of land 39, with the combined forces of the output pressure $P_s$ and spring 42 applied at the bottom of land 41. When a departure from the desired pressure differential exists, pilot valve 38 either moves downward to put chamber 27 in communication with pressure $P_s$ to allow throttling valve 28 to move to the right, or pilot valve 38 moves upwardly to put chamber 27 in communication with pressure $P_1$ to move valve 28 to the left. The pressure within chamber 27 is really a control pressure, the force of which, together with the force of spring 30, must balance the input pressure $P_1$ which is applied at the left-hand side of throttling valve 28.

With increases in pressure $P_1$ the piston 55 also will be moved to the left thus modifying the position of the cam lift 54 and altering the load on the bias spring 42. This in turn will re-determine the pressure differential between the fluid in conduit 19 and that in conduit 33 since it will be clear that with an increased load on spring 42 a greater primary pressure $P_1$ will be necessary to operate the pilot valve 38.

Since the spring 57 provides a force to the right in opposition to the pressure which acts to move the piston 55 to the left, it will be seen that in effect, as $P_1$ varies, the cam 54 is moved linearly and the configuration of the cam 54 may be predetermined so as to effect any predesired pressure differential between the fluid flowing in primary and that flowing into the secondary conduits. The small errors induced by a portion of the piston 55 being exposed to $P_s$ pressure and by the loading of the cam in the direction of pilot valve movement can be compensated for in the design of the cam.

It will be understood of course that any tendency to hunt can be eliminated in known manner as by inserting adjustable orifices for example in the ducts 45 and 49.

From the above explanation of my invention it will be apparent that a regulating device of the above-described type provides an improved throttling valve which can be adjusted to operate according to any preselected function of inlet pressure and is capable of handling much higher flows than has been possible heretofore.

Altho only one combustor 1 and one nozzle 2 have been illustrated, a pressure regulating device in accordance with my invention is particularly adapted for use with a plurality of combustors having fuel nozzles in parallel. Gas turbine powerplants embodying such an arrangement of combustors are disclosed in Patent No. 2,479,573, granted August 23, 1949, to Alan Howard and in Patent No. 2,432,359, granted December 9, 1947 to Dale D. Streid, both of which are assigned to the instant assignee.

While a particular embodiment of my invention has been illustrated and described, modifications thereof will readily occur to those skilled in the art. It should be understood, therefore, that the invention is not limited to the particular arrangement disclosed but that the appended claims are intended to cover all modifications which do not depart from the true spirit and scope of my invention.

What I claim is:

1. A device for controlling fluid flow and pressure differential between an inlet conduit and a discharge conduit as a function of a variable inlet pressure comprising, a movable flow throttling member connected between said inlet and said discharge conduits, means connected to said movable member for positioning thereof as a function of the pressure differential between said inlet conduit and said discharge conduit, bias means connected to said positioning means, and means connected to said bias means and responsive to said inlet pressure for modifying the bias of said positioning means according to a preselected schedule of inlet fluid pressure.

2. A device for maintaining a predetermined fluid pressure differential between an inlet conduit and a discharge conduit as a function of a variable inlet pressure comprising, a valve disposed between said conduits to throttle fluid flow into said discharge conduit, a servo system for positioning said throttle valve as a function of the differential between inlet and discharge pressure, means for biasing said servo system, and means connected to said bias means for automatically varying said bias according to a preselected schedule of inlet fluid pressure.

3. A device for regulating the fluid pressure differential between an inlet conduit and a discharge conduit as a function of inlet pressure comprising, a movable flow throttling member for controlling flow between said inlet and said discharge conduits, a pilot valve for positioning said movable member as a function of inlet and discharge fluid pressures, spring means for biasing said pilot valve in a direction tending to oppose the opening movement of said movable member, a cam for variably loading said spring means and connected for actuation in response to inlet fluid pressure to vary the bias of said pilot valve in accordance with a preselected schedule of inlet fluid pressure.

4. A fluid flow control valve for controlling the flow of a fluid between an inlet conduit and a discharge conduit as a function of the fluid pressures within said conduits comprising three pistons each connected on a first side to said inlet conduit for actuation in a first direction in response to inlet fluid pressure, biasing means for each of said pistons for bias thereof in opposition to said inlet fluid pressure, means interconnecting the first of said pistons with the biasing means of the second of said pistons for varying the setting of said second piston biasing means as a predetermined function of the movement of said first piston, each piston including a second side opposite said first side, a connection from said discharge conduit to said second side of said second piston for actuation thereof in the same direction as said biasing means, a control pressure chamber on said second side of the third piston for actuation thereof in the same direction as said biasing means, an inlet from said second piston to said control pressure chamber for alternate connection either to said discharge conduit upon movement of said second piston in said first direction to lower the pressure within said control chamber or to said inlet conduit upon movement of said second piston in the opposite direction to raise the control pressure within said chamber.

5. A fluid flow control device for providing a flow of fluid which is a predetermined function of the pressure of fluid entering the device comprising an inlet conduit, three pistons connected to said inlet conduit for movement in a first direction in response to fluid pressure from said inlet conduit, a biasing spring for each piston for bias thereof in opposition to the fluid pressure from said inlet conduit, means connected between the first of said pistons and the biasing spring of the second of said pistons for adjusting the compression of said second piston spring upon movement of said first piston, a discharge conduit, a connection from said discharge conduit to said second piston for actuation thereof in the direction of said spring bias in response to discharge conduit fluid pressure, a control fluid conduit connecting said second piston with the third piston for actuation thereof in the direction of said spring bias, said second piston including means to connect inlet pressure fluid to said third piston through said control conduit upon movement of said second piston in the direction of said spring bias and to connect discharge fluid pressure to said third piston through said control conduit upon movement of said second piston in said first direction.

6. A three stage hydraulic fluid flow control device comprising an inlet conduit and an outlet conduit, first, second and third stage pistons spring biased in one direction and connected to said inlet conduit for movement in the opposite direction in response to inlet fluid pressure, said second stage piston having a connection to said discharge conduit for actuation in the direction of spring bias in response to discharge fluid pressure, a mechanical connection between said first stage piston and said second stage biasing spring for varying the setting of said second stage bias spring as a predetermined function of the position of said first stage piston, a control pressure chamber, a fluid flow control port connecting said second stage piston and said control pressure chamber, said second stage piston including a fluid flow control valve land connected for closing said control port at a predetermined centered position and for alternatively opening said control port to said inlet or discharge conduits upon movement away from said predetermined centered position, said third stage piston being in communication with said control pressure chamber for actuation thereof in the direction of spring bias by the fluid pressure within said control pressure chamber.

7. A device responsive to fluid pressure differences between a high pressure conduit and a low pressure conduit comprising a flow control valve arranged between said conduits, said valve being positionable between fully open and fully closed limits by a force derived from fluid pressure from one of said conduits applied in opposition to a force derived from a control fluid pressure within a chamber adjacent to said valve, a pilot valve positionable between a first on range, an intermediate off position and a second on range by a balance of forces respectively derived from said high and low pressure conduits to connect said high pressure conduit to said chamber to raise said control pressure when in said first on range and to alternatively connect said low pressure conduit to said chamber to lower said control pressure when in said second on range.

8. A device for controlling fluid pressure at a predetermined differential between an inlet conduit and a discharge conduit comprising a spring biased throttling piston arranged between said inlet and said discharge conduits, a control pressure chamber adjacent to said piston, said piston being positioned by fluid pressure from said inlet conduit applied in opposition to the combined forces of said spring and a control fluid pressure within said chamber, a spring biased pilot valve for alternately increasing or decreasing said control fluid pressure by alternate connection of said chamber to said inlet conduit or to said discharge conduit to thereby position said throttling piston to maintain a predetermined pressure differential between said inlet and discharge conduits irrespective of volume of fluid flow through said throttling valve.

9. A device for controlling fluid pressure at a predetermined differential between an inlet conduit and a discharge conduit comprising a spring biased throttling piston arranged between said inlet and said discharge conduits, a control pressure chamber adjacent to said piston, said piston being positioned by fluid pressure from said inlet conduit applied in opposition to the combined forces of said spring and a control fluid pressure within said chamber, a spring biased pilot valve for alternately increasing or decreasing said control fluid pressure by alternate connection of said chamber to said inlet conduit or to said discharge conduit to thereby position said throttling piston to maintain a predetermined pressure differential between said inlet and discharge conduits irrespective of volume of fluid flow through said throttling valve, said pilot valve being positionable by fluid pressure from said inlet conduit in opposition to the combined forces of said pilot valve biasing spring and fluid pressure from said discharge conduit.

10. A device for controlling fluid pressure at a predetermined differential between an inlet conduit and a discharge conduit comprising a spring biased throttling piston arranged between said inlet and said discharge conduits, a control pressure chamber adjacent to said piston, said piston being positioned by fluid pressure from said inlet conduit applied in opposition to the combined forces of said spring and a control fluid pressure within said chamber, a spring biased pilot valve for alternately increasing or decreasing said control fluid pressure by alternate connection of said chamber to said inlet conduit or to said discharge conduit to thereby position said throttling piston to maintain a predetermined pressure differential between said inlet and discharge conduits irrespective of volume of fluid flow through said throttling valve, said pilot valve being positionable by fluid pressure from said inlet conduit in opposition to the combined forces of said pilot valve biasing spring and fluid pressure from said discharge conduit, a movable cam for altering the bias of said pilot valve biasing spring and a second piston in communication with said inlet conduit and connected to said cam for movement thereof in response to changes in said inlet pressure for altering the predetermined pressure differential of said device as a prescheduled function of said inlet pressure.

11. In a fluid supply system of the type having primary and secondary portions wherein the primary portion is continuously supplied with fluid at a varying pressure depending upon fluid delivery requirements and the secondary portion is supplied from the primary portion, a flow divider valve connected between said primary portion and said secondary portion for controlling the flow of fluid from said primary to said secondary portion as a predetermined function of the primary fluid pressure comprising an inlet conduit connected to said primary portion, a discharge conduit connected to said secondary portion, a spring biased throttling piston connected to said inlet conduit from said primary portion for actuation in an opening direction in response to primary fluid pressure, a control pressure chamber for said throttle piston connected thereto for opposition to opening movement thereof by the control pressure fluid therein, a spring biased hydraulic servo fluid control valve connected to said control pressure chamber and to said inlet and discharge conduits and positionable in response to said primary fluid pressure in opposition to said secondary fluid pressure plus said spring bias for alternatively connecting primary and secondary fluid pressure to said control pressure chamber, a cam connected to one end of said servo biasing spring and a cam positioning piston connected thereto and connected to said inlet conduit for positioning said cam in accordance with variations in said primary pressure to thereby vary the spring bias of said servo control valve.

References Cited in the file of this patent

UNITED STATES PATENTS

| Number | Name | Date |
|---|---|---|
| 2,477,247 | Haberland | July 26, 1949 |